United States Patent [19]

Kawai et al.

[11] Patent Number: 5,029,317
[45] Date of Patent: Jul. 2, 1991

[54] MAGNETIC RECORDING MEDIUM CAPABLE OF RECORDING INFORMATION AT A HIGH RECORDING DENSITY

[75] Inventors: Hisao Kawai; Akinori Kurikawa; Hisanori Suzuki, all of Tokyo, Japan

[73] Assignee: Hoya Corporation, Tokyo, Japan

[21] Appl. No.: 531,024

[22] Filed: May 31, 1990

[30] Foreign Application Priority Data

May 31, 1989 [JP] Japan .................................. 1-138095

[51] Int. Cl.$^5$ ............................ G11B 5/66; G11B 5/72
[52] U.S. Cl. ..................................... 360/131; 360/134
[58] Field of Search ........................ 360/131, 134, 135

[56] References Cited

U.S. PATENT DOCUMENTS 4,639,815  1/1987  Arai et al. ....................... 360/134 X

FOREIGN PATENT DOCUMENTS 62-250522  10/1987  Japan ............................... 360/131 B Primary Examiner—John H. Wolff
Attorney, Agent, or Firm—Ladas & Parry

[57] ABSTRACT

In a magnetic recording medium comprising a substrate of either a glass material or a ceramic material, a magnetic layer, a protection layer, and a lubricant layer, the protection layer comprises a first protection layer of a nonmagnetic material on the magnetic film and a second protection film of an inorganic compound on the first protection layer. The first protection film may be composed of at least one material selected from nonmagnetic metals, semiconductors, and their compounds and may have a thickness between 20 and 150 angstroms while the second protection film is formed by an inorganic oxide film and hard minute particles which have an average particle size between 50 and 300 angstroms and which are dispersed into the inorganic oxide film. The substrate provides a principal surface having a surface roughness which is not greater than 100 angstroms when the surface roughness is represented by a maximum height (Rmax), which provides a medium principal surface having a surface roughness between 50 and 300 angstroms.

15 Claims, 4 Drawing Sheets

MAGNETIC RECORDING MEDIUM CAPABLE OF RECORDING INFORMATION AT A HIGH RECORDING DENSITY

BACKGROUND OF THE INVENTION

This invention relates to a magnetic recording medium for use in recording information at a high density and to a method of manufacturing the magnetic recording medium. It is to be noted throughout the instant specification that a magnetic disk will be mainly described as an example of the magnetic recording medium hereinunder and will be included in a magnetic disk device, although this invention is not restricted to the magnetic disk or the magnetic disk device.

A magnetic disk of the type described has a great number of tracks on which information is linearly recorded or read out by sliding or flying a magnetic head over the magnetic disk along a circumferential path.

A recent requirement for such a magnetic disk is to record information on the magnetic recording disk at a high recording density. In order to accomplish a high recording density, consideration must be made about a linear density and a track density on the magnetic disk, although description will be mainly directed to the linear density hereinunder.

It is to be noted that the linear density is correlated to a flying height of the magnetic head, namely, a distance between the magnetic head and the magnetic recording medium. More specifically, the flying height should be reduced as much as possible with an increase of the linear density. A recent requirement is that the magnetic head flies over the magnetic disk at a flying height equal to or less than 1500 angstroms during recording or reproducing information on the magnetic disk. In order to render the flying height equal to or less than 1500 angstroms, it is necessary that contact never takes place between the magnetic head and projections remaining on the surface of the magnetic disk even when the magnetic head flies over the magnetic disk at a flying height equal to or less than 1000 angstroms.

Moreover, a further reecent proposal has been offered about recording and reproducing information on a magnetic disk by bringing a magnetic disk into contact or near contact with a magnetic disk, so as to further improve linear density. Such a recording or a reading method will be collectively called contact recording. In this event, the flying height of the magnetic head is less than 1000 angstroms. Specifically, the flying height is perferably equal to or less than 760 angstroms (3 microinches).

In order to carry out the contact recording, the magnetic disk itself should have an excellent mechanical durability and an extremely uniform disk or medium principal surface because the magnetic head is brought into contact with the magnetic disk now and then. In addition, when the flying height of the magnetic head is reduced to 760 angstroms, it often happens that the magnetic head objectionably contacts with the magnetic disk due to vibration or mechanical shock imparted from an external device, such as an actuator, while the magnetic head is traveling over the magnetic disk.

In this connection, it is very important that the magnetic disk for such contact recording does not have, on the disk principal surface, any irregular projections greater than the flying height of the magnetic head.

Herein, it is noted that collision between the projections and the magnetic head can be evaluated by a glide test which is carried out by making the magnetic head glide over the medium or disk principal surface with a distance left between the magnetic head and the disk principal surface. It is said that the magnetic disk for contact recording must pass the glide test carried out at a flying height which is less than 1000 angstroms and which may be preferably 760 angstroms.

A conventional magnetic disk is disclosed in Japanese Unexamined Patent Publication Nos. Syuo 52-20804, namely, 20804/1977 and will be referred to as a first conventional magnetic disk. The first conventional magnetic disk comprises a substrate of an aluminum alloy, a nonmagnetic layer of Ni-P on the substrate, a magnetic layer of Co-Ni-P on the nonmagnetic layer, and a protection layer on the magnetic layer. The protection layer is effective to protect the magnetic layer from a head crash, abrasion of the magnetic layer, and the like. In such a first conventional magnetic disk, the protection layer is formed by applying a tetrahydroxy silane solution on the magnetic layer and thereafter heating the solution. The protection layer is 1,000 angstroms thick and may be composed of a polysilicate layer which is active.

Inasmuch as the substrate is composed of the aluminum alloy in the first conventional magnetic disk, it is very difficult to completely remove projections from a substrate principal surface even no matter how the substrate is polished. As a result, the projections which have heights between 1,000 and 2,000 angstroms are inevitably left on the substrate. When the nonmagnetic layer, the magnetic layer, and the protection layer are successively formed on such a substrate having the projections, surface projections which exceed 1,000 angstroms inevitably remain on the disk principal surface. Accordingly, when subjected to the glide test which is less than 1000 angstroms and which may be carried out, for example, at the flying height of 760 angstroms, the first conventional magnetic disk can not pass the glide test. This shows that it is impossible to lower the flying height to a height lower than 1000 angstroms on recording or reading information.

It is mentioned here that a distance between the magnetic layer and the magnetic head should be reduced so as to establish a high recording density. In this connection, it is preferable that a thickness of the protection layer is equal to or less than 500 angstroms. In particular, the thickness of the protection layer is preferably equal to or less than 200 angstroms.

As regards the first conventional magnetic disk, the protection layer is as thick as 1,000 angstroms, as mentioned before, Such a thick protection layer makes the distance between the magnetic layer and the magnetic head objectionably great and makes it difficult to record information at a high recording density on the magnetic disk.

In addition, the polysilicate layer which is used as the protection layer has no property of reducing friction between the magnetic disk and the magnetic head when the magnetic head is brought into contact with the magnetic disk. Therefore, the protection layer of polysilicate is low in abrasion resistance.

Inasmuch as the protection layer is formed by an active polysilicate layer directly attached to the magnetic layer, the active polysilicate layer adversely affects the magnetic layer to deteriorate characteristics of the magnetic layer and to thereby degrade recording and reproduction characteristics. Moreover, the polysilicate layer has a low ability of preventing water from entering the magnetic layer. Therefore, a lot of defects take place on the magnetic disk and reduce characteristics of the magnetic disk due to intrusion of water into the magnetic layer.

Another conventional magnetic disk is disclosed in Japanese Unexamined Patent Publication Nos. Syo 61-73227, namely, 73227/1986, and will be referred to as a second conventional magnetic disk. More particularly, a substrate of aluminum is prepared on which a nonmagnetic layer of Ni-P and a magnetic layer of Co-Ni-P are successively deposited on the aluminum plate. On the magnetic layer, a protection layer is formed by coating, a tetrahydroxy silane solution including hard minute particles and by heating the tetrahydroxy silane solution. The protection layer formed in the above-mentioned manner is composed of a polysilicate layer and the hard particles dispersed into the polysilicate layer. Finally, a lubricant layer of perfluoro polyether is formed on the protection layer.

With this structure, the abrasion resistance is improved as compared with the first conventional magnetic disk and the lubricant layer is desirably attached to the protection layer because the hard minute particles are dispersed into the polysilicate layer.

However, it is difficult to avoid occurrence of projections which have heights greater than 1000 angstroms because of the use of the substrate of aluminum. In addition, the second conventional magnetic disk uses a substrate which has an average roughness (Ra) of about 200 angstroms, prescribed by Japanese Industrial Standard, namely JIS. Inasmuch as such an average roughness of about 200 angstroms substantially falls within a range between 1000 and 2000 angstroms when the average roughness is expressed in terms of a maximum height (Rmax) determined by JIS, the second conventional magnetic disk is not suitable for contact recording.

In addition, since the polysilicate layer is used as the protection layer in the second conventional magnetic layer also, the magnetic layer can not be sufficiently protected by the protection layer, as mentioned in conjunction with the first conventional magnetic disk.

SUMMARY OF THE INVENTION

It is an object of this invention to provide a magnetic recording medium which is effective to reduce the flying height.

It is another object of this invention to provide a magnetic recording medium of the type described, wherein a magnetic head can be moved at a flying height equal to or less than 1000 angstroms and which therefore enables a high recording density.

It is still another object of this invention to provide a magnetic recording medium of the type described, which has excellent abrasion resistance.

It is yet another object of this invention to provide a magnetic recording medium of the type described, which is capable of avoiding degradation of the magnetic layer for a long time.

A magnetic recording medium to which this invention is applicable comprises a substrate member having a principal surface, a magnetic layer on the principal surface, a protection layer formd on the magnetic layer to protect the magnetic layer, and a lubricant layer on the protection layer. According to an aspect of this invention, the substrate member comprises a substrate composed of glass or ceramic material while the protection layer comprises a first protection film of a nonmagnetic material on the magnetic layer and a second protection film on the first protection film. The second protection film is formed by an inorganic oxide film and hard minute particles dispersed in the inorganic oxide film. The inorganic oxide film comprises at least one inorganic oxide selected from the group consisting of silicon oxide and metal oxides.

DESCRIPTION OF THE PREFERRED EMBODIMENTS

First embodiment

Figure 1:
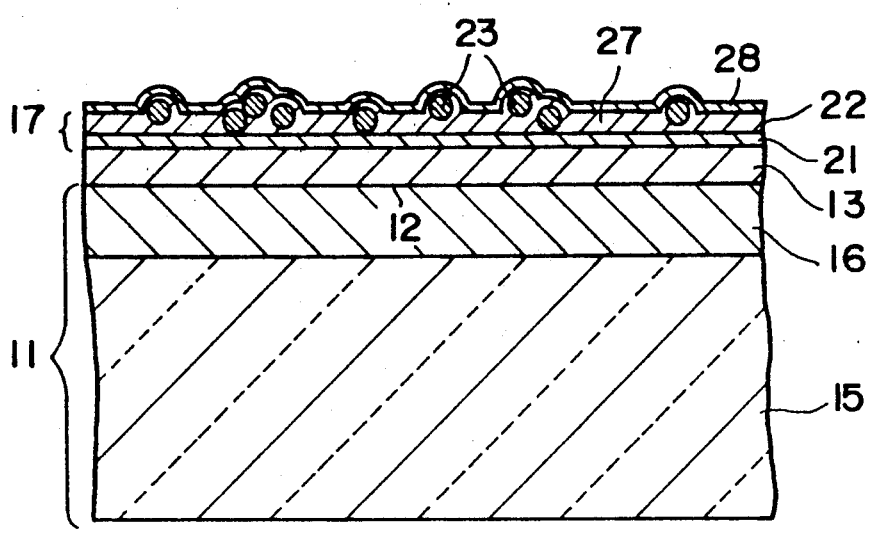
FIG. 1 shows an enlarged partial sectional view of a magnetic recording medium according to a first embodiment of this invention.

Referring to FIG. 1, a magnetic recording medium according to a first embodiment of this invention comprises a substrate member 11 which has a principal surface 12 directed upwards in FIG. 1 and a magnetic layer 13 on the principal surface 12. In the example being illustrated, the magnetic layer 13 has a thickness of 600 angstroms and is composed of CoNiCr. In addition, the illustrated substrate member 11 comprises a substrate 15 of soda-lime glass and a backing layer 16 located on the magnetic layer 13. The backing layer 16 is also between the substrate 15 and the magnetic layer 13 and may be also called an intermediate layer. The illustrated backing layer 16 is formed of chromium and provides the principal surface 12 of the substrate member 11.

On manufacturing the illustrated substrate member 11, the substrate 15 is prepared which is formed as a disk shaped sode-lime plate having a diameter of 130 millimeters, a thickness of 1.9 millimeters, and a central hole having a diameter of 40 millimeters. The substrate 15 has a front surface and a rear surface which are directed upwards and downwards in FIG. 1, respectively, and which are polished so that the surface roughness is equal to 30° angstroms, the surface roughness being defined by a maximum height (Rmax) determined by JIS. In this connection, the surface roughness hereafter is assumed to be given by the maximum heights (Rmax) hereinunder.

After polishing the substrate 15, the substrate 15 is washed to remove any contamination from the front and the rear surfaces thereof.

Subsequently, the substrate 15 is introduced into a sputtering apparatus to deposit the backing or intermediate layer 16 of chromium by the use of a chromium target and an argon gas to a thickness of 2000 angstroms. After deposition of the intermediate layer 16, the magnetic layer 13 of CoNiCr is deposited on the principal surface 12 to the thickness of 600 angstroms within the sputtering apparatus. In this case, sputtering is carried out by the use of a CoNiCr target and an argon gas.

A protection layer 17 is formed on the magnetic layer 13 to protect the magnetic layer from errosion or destruction. In the illustrated example, it is to be noted that the protection layer 17 comprises a first protection film 21 of a nonmagnetic material on the magnetic layer 13 and a second protection film 22 formed in a manner to be presently described. Specifically, chromium is used as the nonmagnetic material of the first protection film 21 in the example being illustrated. The first protection film 21 of chromium is deposited within the sputtering apparatus by the use of a chromium target and an argon gas to a thickness of 50 angstroms.

The second protection film 22 comprises an inorganic oxide layer and hard minute particles 23 dispersed in the inorganic oxide layer. The second protection film 22 is divisible into first and second areas 26 and 27 which have the hard minute particles and no hard minute particles, respectively. In order to form such a second protection film 22, tetra ethoxy-silane ($Si(OC_2H_5)_4$) and minute silica particles are used as an organosilic compound and the hard minute particles, respectively, and are mixed with water, and iso-propyl alcohol to form a mixed solution. A mixing rate of the tetra ethoxy-silane, the minute silica particles, water, and iso-propyl alcohol is equal by weight to 10:0.3:3:500. In this case, the minute silica particles have an average particle size of about 120 angstroms when measured by a particle distribution measurement machine, namely, a COULTER MODEL N4 MACHINE manufactured and sold by COULTER ELECTRONICS INC. The mixed solution is coated on or applied to the first protection film 21 by spin coating to leave a thin film on the first protection film 21. Herein, it is noted that the average particle size is obtained by calculating average values of particle sizes of spherical particles and nonspherical particles.

Subsequently, the thin film is formed by coating the mixed solution of the organosilic compound and the silica minute particles on the first protection film 21 and heating to a temperature of about 250° C. Thus, the second protection film 22 remains on the first protection film 21 and is divisible into the second area 27 of polysilicate and the first area 26 of the minute silica particles, as mentioned before. In the illustrated example, the second area 27 has a thickness of 100 angstroms.

On the second protection film 22, a lubricant layer 28 is formed by a lubricant which may be composed of perfluoro polyether and which may be, for example, AM2001 manufactured and sold by Montedison Company Limited. The lubricant layer 28 provides a medium or disk principal surface.

Thereafter, projections are removed from the medium principal surface by the use of a burnish head. Thus, the magnetic recording medium according to the first embodiment is manufactured through the above-mentioned steps.

Herein, a surface roughness of the magnetic recording medium mentioned above has been measured by Talystep manufactured by Rank Tayer Hobson. In addition, the magnetic recording medium has been subjected to a glide test and a contact start stop (CSS) test by the use of a magnetic head comprising a slider portion formed by a sintered body of $Al_2O_3$-TiC. Furthermore, a magnetic characteristic has been also measured by making the magnetic head fly over the magnetic recording medium. As a result of measurement of the surface roughness, it has been found that the magnetic recording medium illustrated in FIG. 1 has surface roughness (Rmax) equal to 150 angstroms. In addition, the illustrated magnetic recording medium has withstood glide tests carried out with distances of 1000 and 760 angstroms between the medium principal surface and the magnetic head. This means that no projections higher than 760 angstroms are present on the medium principal surface. Moreover, the contact start stop (CSS) test has been repeated 50,000 times by the use of the magnetic head. Consequently, a coefficient of static friction has been equal to or less than 0.5 after the contact start stop tests of 50,000 times. Thus, the magnetic recording medium has shown an excellent abrasion resistance.

Besides, the magnetic characteristic has been measured at flying heights of 1000 and 760 angstroms. In consequence, it has been found that the magnetic recording medium has had an excellent magnetic characteristic and has established a high recording density equal to or greater than 45 kilobits/inch (KBPI).

As mentioned before, the magnetic recording medium according to the first embodiment of this invention comprises the first protection film 21 in addition to the second protection film 22. Consideration will be directed to the reason why the first protection film 21 underlies the second protection film 22 hereinunder. To this end, first through fifth magnetic recording media according to the first embodiment of this invention have been prepared to form the second protection films 22 by heating the thin films of tetra ethoxy-silane heated to 250° C., room temperature, 150° C. 200° C., and 300° C., respectively.

Likewise, first through fifth conventional magnetic recording media have been prepared which do not comprise the first protection films 21 and which only comprise the second protection films 22 formed by heating the thin films of tetra ethoxy-silane to 250° C., room temperature, 150° C., 200° C., and 300° C., respectively.

Figure 2:
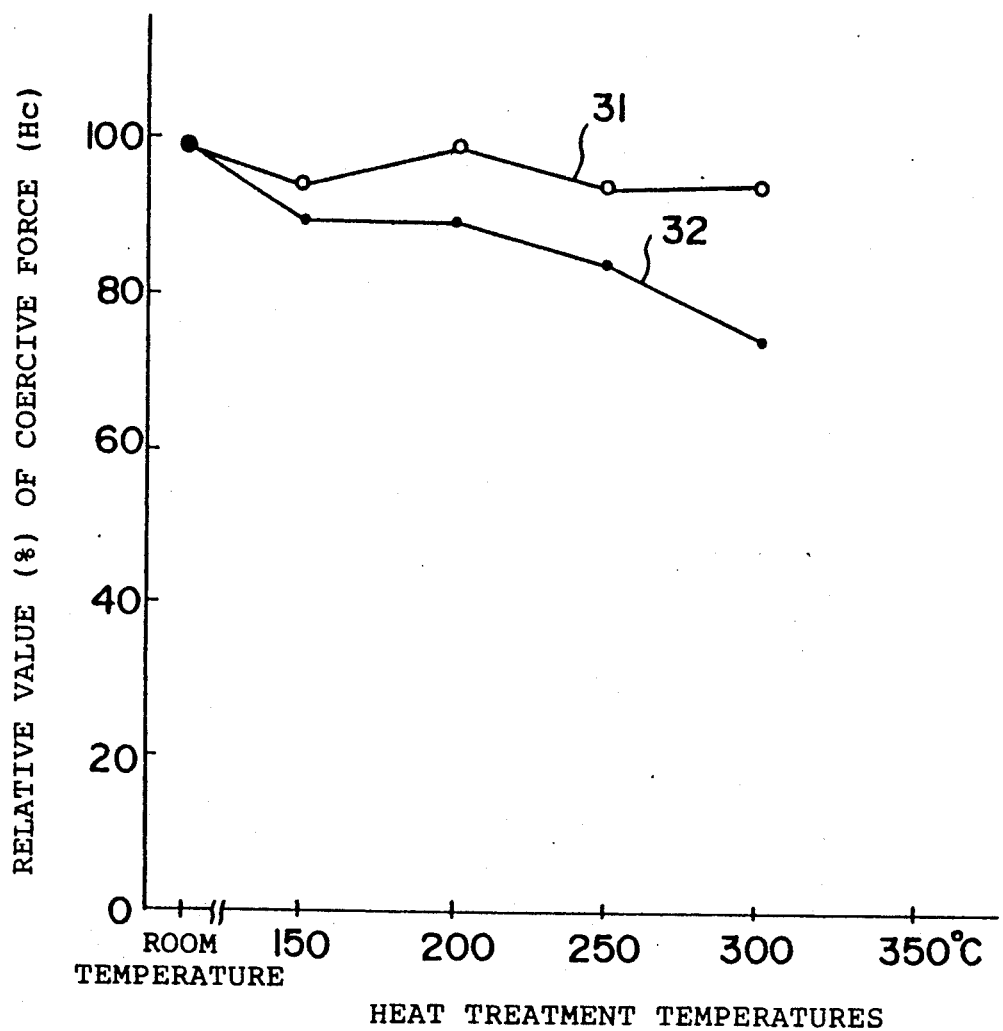
FIG. 2 shows a graphical representation for use in describing characteristics of the magnetic recording media illustrated in FIG. 1 in comparison with those of conventional recording media.

Referring to FIG. 2, wherein the abscissa and ordinate respectives represent heat treatment temperatures and relative values (%) of coercive force, curve 31 shows a characteristic of the first through the fifth magnetic recording media according to the first embodiment of this invention while curve 32 shows a characteristic of the first through the fifth conventional magnetic recording media. As apparent from the curve 31, the first through the fifth magnetic recording media according to the first embodiment of this invention exhibit the relative values of coercive force which are scarcely varied even when the second protection films 22 are formed at a high temperature of 300° C. On the other hand, the first through the fifth conventional magnetic recording media have relative values of coercive force undesirably reduced with an increase of the heat treatment temperatures, as apparent from the curve 32. From this fact, it is readily understood that the first protection film 21 serves to avoid a reduction of the coercive force even when the second protection film 22 is formed at a high temperature.

Figure 3:
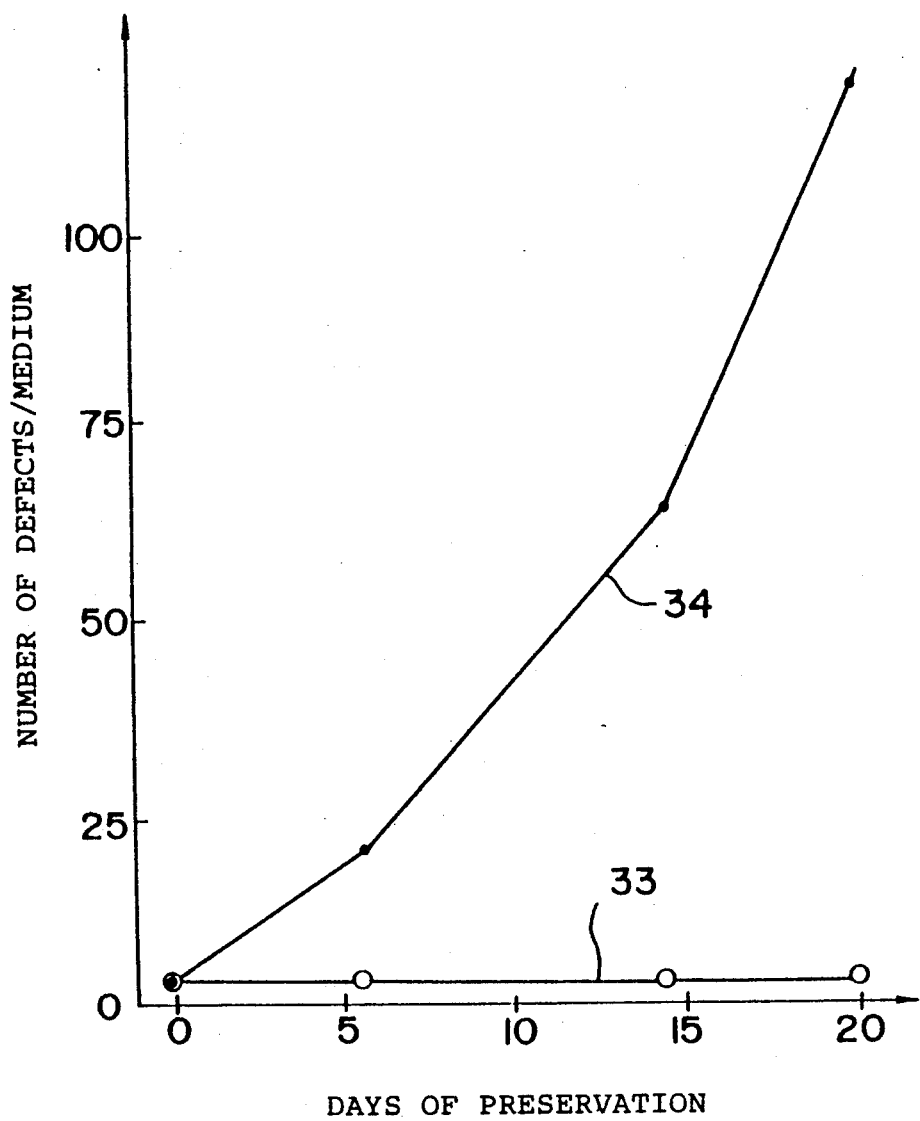
FIG. 3 shows a graphical representation for use in describing aging characteristics of the magnetic recording medium illustrated in FIG. 1 in comparison with a conventional magnetic recording medium.

Referring to FIG. 3, wherein the abscissa and ordinate represent days of preservation of each magnetic recording medium and the number of defects per each medium, curves 33 and 34 show aging characteristics of the magnetic recording medium according to this invention and the conventional magnetic recording medium, respectively. The magnetic recording medium according to this invention and the conventional magnetic recording medium may be considered as the first magnetic recording medium and the first conventional magnetic recording medium each of which comprises the second protection film 22 formed at the temperature of 250° C. In order to measure such aging characteristics, each magnetic recording medium has been preserved in an atmosphere kept at a high temperature of 85° C. and at high humidity of 85% and thereafter the number of defects have been temporally measured in every medium by the use of RD008 Media Certifier manufactured by Adelphi in U.S.A.

As shown by the curve 33, an increase of defects has been rarely found in the first magnetic recording medium according to this invention after preservation for a long time while the defects have drastically increased in the first conventional magnetic recording medium, as shown by the curve 34. From this fact, it is readily understood that the first protection film 21 according to this invention is very effective to avoid occurrence of defects in the magnetic recording medium.

Although the second protection film 22 of silicon oxide is formed by the use of tetra ethoxy-silane which is an organosilic compound, the tetra ethoxy-silane may be replaced by hydrolysates which are obtained by partially or completely hydrolyzing the tetra ethoxy-silane. If materials are selected such that silicon oxide occurs due to a sol-gel method, use may be made of silicon alkoxyde and its hydrolysates resulting from partially or completely hydrolyzing the silicon alkoxyde. For example, the silicon alkoxyde may be, for example, either tetra alkoxy silane, such as tetra methoxy silane, tetra-n-propoxy silane, tetra-1-propoxy silane, tetra-n-butoxy-silane, tetra-sec-butoxy-silane, tetra-tert-butoxy-silane, or silicon alkoxide, such as monoalkyl dialkoxy silane, dialkyl dialkoxy silane, trialkyl monoalkoxy silane, produced by substituting one through three alkyl groups for alkoxy groups of the tetra alkoxy silane. In addition, use may be made of hydrolysates of silicon alkoxide resulting from partially or completely hydrolyzing the silicon alkoxide.

The magnetic recording medium according to the first embodiment can fly past the magnetic head at a flying height less than 1000 angstroms and can pass the glide test of 760 angstroms. Therefore, the magnetic recording medium illustrated in FIG. 1 can be used for contact recording.

Second Embodiment

Figure 4:
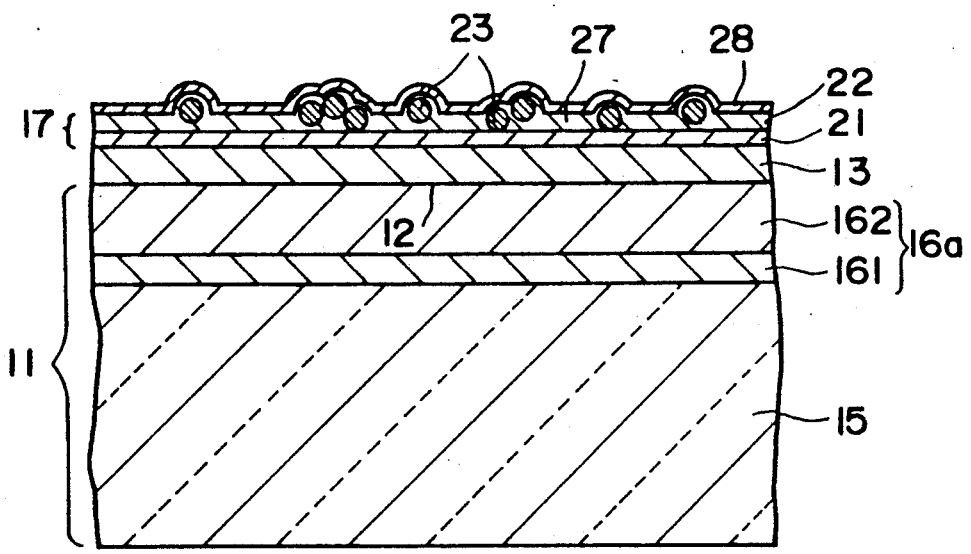
FIG. 4 shows an enlarged partial sectional view of a magnetic recording medium according to a second embodiment of this invention.

Referring to FIG. 4, a magnetic recording medium according to the second embodiment of this invention comprises similar parts designated by like reference numerals in FIG. 1. In FIG. 4, the substrate member 11 comprises the substrate 15 of soda-lime glass having a substrate principal surface and a backing or intermediate layer which is depicted at 16a and which is deposited on the substrate principal surface. In the illustrated example, the backing layer 16a comprises a first backing film 161 of TiW and a second backing film 162 of chromium. The first and the second backing films 161 and 162 are deposited by sputtering to thicknesses of 500 angstroms and 3,000 angstroms, respectively. The first backing film 161 is formed by the use of a TiW target and argon gas while the second backing film 162 is formed by the use of a chromium target and an argon gas. It has been confirmed that the first backing film 161 serves to improve magnetic characteristics, such as modulation.

In the illustrated example, the magnetic layer 13 of CoCrTa is deposited on the principal surface of the substrate member 11 to a thickness of 700 angstroms by sputtering by the use of a CoCrTa target and an argon gas. On the magnetic layer 13, the first protection film 21 of TiW is deposited to a thickness of 30 angstroms in a manner similar to deposition of the first backing film 161.

Thereafter, the second protection film 162 is formed on the first protection film 161 in the following manner. Specifically, triethoxy aluminum $(Al(OC_2H_5)_3)$ and alumina particles are prepared as an organometallic compound and hard minute particles, respectively. The alumina particles have an average particle size of 200 angstroms when measured by a particle distribution measurement machine, namely, a COULTER MODEL N4 MACHINE manufactured and sold by COULTER ELECTRONICS INC. The triethoxy aluminum, the alumina particles, water, methyl alcohol, and acetic acid are mixed at a rate of 1:0.0001:0.2:100:0.01 by weight to make a mixed solution. The substrate member 11 on which the magnetic layer 13 and the first protection film 21 are deposited is immersed into the mixed solution and kept within the mixed solution for one minute. Thereafter, the above-mentioned substrate 11 is slowly pulled up from the mixed solution at a rate of about 10 cm/minute and taken out. Thus, a thin film is formed on the first protection film 21 and is composed of organic aluminum compound including the alumina minute particles. Thereafter, the thin film is heated together with the substrate member 11, the magnetic layer 13, and the first protection film 21 to a temperature of 275° C. and is kept at the temperature for one hour. As a result, the second protection film 22 is left on the first protection film 21 and is formed by an aluminum oxide film in which the minute alumina particles are dispersed. As in FIG. 1, the second protection film 22 is divisible into the first and the second areas 26 and 27 which have the minute alumina particles and no-alumina minute particles, respectively. The second area 26 has a thickness of 150 angstroms.

Subsequently, immersion coating is carried out to form the lubricant layer 28 having a thickness of 15 angstroms. In this case, perfluoro polyether is used as a lubricant and may be, for example, CRYTOX157FSL manufactured by Du Pont. After the lubricant layer 28 is formed, projections are removed from the medium principal surface by a burnish head. Thus, the magnetic recording medium according to the second embodiment of this invention is manufactured with the first and the second backing films 161 and 162 and the first and the second protection films 21 and 22.

As in the magnetic recording medium according to the first embodiment, evaluation has been made of the magnetic recording medium according to the second embodiment also. First, the surface roughness (Rmax) of the magnetic recording medium according to the second embodiment has been measured by Talystep and has been found to be 200 angstroms. The illustrated magnetic recording medium has undergone the glide test carried out with a distance of 760 angstroms left between the medium principal surface and the magnetic head. In addition, the coefficient of static friction has been equal to 0.4 after the contact start stop test has been repeated 50,000 times. The magnetic characteristics have also been excellent as in the first embodiment.

As in FIGS. 2 and 3, the coercive force and the aging characteristics have been measured in a manner similar to those illustrated in FIGS. 2 and 3. In consequence, similar results have been obtained in the second embodiment as the first embodiment. Accordingly, the first protection film 21 is effective to avoid a reduction of the coercive force and occurrence of defects.

The magnetic recording medium according to the second embodiment can operate with a flying height equal to or less than 1000 angstroms and which is applicable to contact recording.

As the organometallic compound of the second protection film 22, triethoxy aluminum is used in the second embodiment to form the metal oxide film composed of aluminum oxide. Instead, hydrolysates of the triethoxy aluminum may be used and may be produced by partially or completely hydrolyzing the triethoxy aluminum.

In addition, any other aluminum alkoxyde or hydrolysates thereof may be also used and may be, for example, tri-alkoxy aluminum or aluminum alkoxide when they form aluminum oxide by the sol-gel method. Specifically, the tri-alkoxy aluminum may be, for instance, trimethoxy aluminum, tri-n-propoxy aluminum, tri-1-propoxy aluminum, tri-n-butoxy aluminum, or the like, while the aluminum alkoxide may be, for instance, monoalkyl dialkoxy aluminum, dialkyl monoalkoxy aluminum, produced by substituting alkyl groups for one or two alkoxy groups of the tri-alkoxy aluminum, or hydrolysates of them.

Instead of the aluminum alkoxide, use may be made of metal alkoxide, such as tantalum alkoxide, tungsten alkoxide, tin alkoxide, zirconium alkoxide, titanium alkoxide, or the like, or organometallic compounds, such as hydrolysates produced by partially or completely hydrolyzing the metal alkoxide, as mentioned above. When the metal alkoxide is used, a metal oxide film is formed as the second protection film 22. This means that the silicon oxide film may be replaced by the metal oxide film of, for example, tantalum, tungsten, tin, zirconium, titanium, or the like. Such a silicon or a metal oxide film may be formed by the other method except the sol-gel method. A plurality of metals may be used to form the metal oxide film while an inorganic oxide film may be used which comprises silicon oxide and metal oxide.

Moreover, the mixed solution for the second protection film 22 may not always include acetic acid. Instead of water included in the mixed solution, water vapor from the atmosphere may be positively utilized so as to obtain a solution which includes hydrolysates of the silicon alkoxide or the metal alkoxide.

Third Embodiment

A magnetic recording medium according to the third embodiment of this invention is similar in structure to that illustrated in FIG. 1 except that a silicon film is used as the first protection film 21, instead of the chromium film. More specifically, the backing layer 16 of chromium and the magnetic layer 13 of CoNiCr are successively deposited on the substrate 15 of soda-lime glass by sputtering. Thereafter, the first protection film 21 of silicon is deposited on the magnetic layer 13 to a thickness of 50 angstroms. In a manner similar to FIG. 1, the second protection film 22 and the lubricant layer 28 are formed to manufacture the magnetic recording medium according to the third embodiment.

When the silicon film is used as the first protection film 21, silicon exhibits excellent wettability with the mixed solution used for forming the second protection film 22 and is firmly adhered to the second protection film 22. This shows that it is possible to obtain a protection layer 17 which is uniform and resistant to mechanical shock. As mentioned before, the first protection film 21 serves to avoid a degradation of the magnetic layer 13 and has a good weatherproof.

Fourth Embodiment

Figure 5:
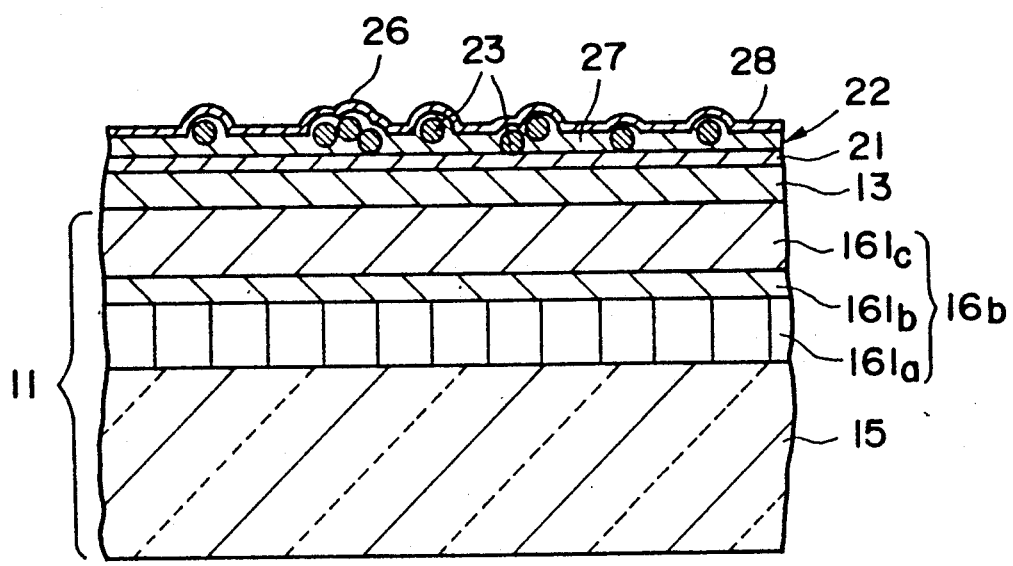
FIG. 5 shows a similar view of a magnetic recording medium according to a fourth embodiment of this invention.

Referring to FIG. 5, a magnetic recording medium according to the fourth embodiment of this invention is similar in structure to that according to the second embodiment illustrated in FIG. 4 except that backing layer 16b illustrated in FIG. 5 comprises a first thin film 161a of chromium on the substrate 15, a second thin film 161b of carbon on the first thin film 161a, and a third thin film 161c of chromium on the second thin film 161b. The first through the third thin films 161a to 161c are deposited by sputtering to thicknesses of 500 angstroms, 150 angstroms, and 3000 angstroms, respectively. Thus, the illustrated backing layer 16b comprises three thin films specified by a structure of Cr/C/Cr.

Thereafter, the magnetic layer 13 of CoCrTa and the first protection film 21 of chromium are successively deposited by sputtering to thicknesses of 700 and 50 angstroms, respectively. On the first protection film 21, an aluminum oxide film including minute alumina particles are formed as the second protection film 22 and the lubricant layer 28 is formed on the second protection film 22.

The illustrated backing layer 16b composed of three thin films are effective to improve modulation, resolution, coercive force, and the like.

This is because the backing layer 16b influences orientation of the magnetic layer 13 and grain growth.

In the first and the second embodiments, the average particle sizes of the hard minute particles are equal to 120 and 200 angstroms, respectively. It is preferable that the average particle size falls within a range between 50 and 300 angstroms and that two or more different sizes of minute particles may be mixed together. At any rate, it is possible to render the surface roughness (Rmax) of the principal surface of the magnetic recording medium within a desired range between 50 and 300 angstroms when the average particle size is between 50 and 300 angstroms.

If the surface roughness (Rmax) is less than 50 angstroms, the magnetic head is undesirably adsorbed onto the magnetic recording medium. On the other hand, if the surface roughness (Rmax) exceeds 300 angstroms, the magnetic head unstably or irregularly operates on the magnetic recording medium. This often results in head crash and deteriorates the magnetic recording and reproducing characteristic. Especially, when contact recording is carried out, it is important to render the surface roughness (Rmax) equal to or less than 300 angstroms because the distance between the magnetic layer and the magnetic head varies with time. Otherwise, serious effects take place in the magnetic characteristics.

When each magnetic recording medium illustrated above is used for the contact recording, the upper limit of the particle size of the minute particles is preferably less than 300 angstroms.

In addition, the second area of the second protection film 22 is absent from any hard minute particles and preferably has a thickness between 20 and 300 angstroms. When the second area is less than 20 angstroms, it is difficult to firmly hold the hard minute particles within the inorganic oxide film. On the other hand, when the thickness exceeds 300 angstroms, there is problem as regards a spacing loss. It is possible to keep the surface roughness (Rmax) within the range between 50 and 300 angstroms by using hard minute particles having an average particle size between 50 and 300 angstroms. The second area of the second protection film 22 may have a thickness between 50 and 200 angstroms so as to preferably control the surface roughness (Rmax) of the medium principal surface within the range between 50 and 300 angstroms for the contact recording.

While this invention thus far been described in conjunction with several embodiments thereof, it will readily be possible for those skilled in the art to put this invention into practice in various other manners. For example, ethyl alcohol and butyl alcohol may be substituted for iso-propyl alcohol and methyl alcohol used in the first and the second embodiments to form the mixed solutions for the second protection films 22, respectively. The hard minute particles may be any other inorganic minute particles than minute silica and alumina minute particles and may be, for example, minute particles of zirconia, titania, silicon carbide, tungsten carbide, or the like. In the hard minute particles, different species of particles may be mixed together. The substrate may be formed by borosilicate glass, aluminosilicate glass, aluminoborosilicate glass, quartz glass, or ceramics. The above-enumerated glass or ceramics can readily render the surface roughness (Rmax) equal to or less than 100 angstroms by polishing. The magnetic layer may be composed of either a cobalt alloy, such as CoNiZr, CoCrPt, CoPt, CoNiPt, or $Fe_2O_3$. The backing layer may be formed by Mo, Ti, Ta, W, Zr, Cu, Al, Zn, In, or Sn and may be removed from the magnetic recording medium.

On depositing the magnetic layer by sputtering, a layer of CoNiPt, CoPt, can provide high coercive force even when directly deposited on the glass substrate. However, when other Co alloys, such as CoNiCr, CoCrTa, CoNiZr, CoCrZr, CoCrPt, are deposited as the magnetic layer, it is necessary to deposit, as the backing layer, a chromium layer including chromium or chromium and a small amount of impurities on the substrate. This is because the length of a crystal lattice of the chromium layer is substantially equal to that of the crystal lattice of the Co alloys. In this case, the chromium layer plays an important role to promote orientation of the magnetic layer, namely, the Co layer. In addition, a single layer or a multilayer may be interposed between the substrate and the chromium layer and may be composed of Cr, Ti, W, Ta, Mo, Zr, Cu, Al, Zn, In, Sn, C, or the like, or their alloys, such as TiW. Such an interposed layer is effective to increase recording density.

Furthermore, the first protection film may be formed by a nonmagnetic material, such as Mo, Ti, Ta, W, Si, Ge, their oxides, nitrides, carbides. In addition, the first protection film may comprise a plurality of nonmagnetic thin films each of which is formed by the nonmagnetic material selected from the above-numerated materials. Preferably, a first thin film has a thickness between 20 and 150 angstroms because the thickness less than 20 angstroms brings about degradation of a magnetic layer while the thickness greater than 150 angstroms results in a spacing loss.

The lubricant layer may be formed either by a liquid lubricant including fluorocarbon or by a lubricant composed of a salt of an alkali metal of sulfacid. The lubricant layer preferably has a thickness between 10 and 30 angstroms. When the thickness of the lubricant layer is less than 10 angstroms, it is difficult to sufficiently improve the abrasion resistance. On the other hand, when the thickness of the lubricant layer exceeds 30 angstroms, the abrasion resistance can not be improved. In addition, a problem takes place as regards the spacing loss.

In the above-mentioned embodiments, the backing layer, the magnetic layer, and the first protection film can be successively deposited within a single sputtering apparatus. Accordingly, it is possible to precisely control the thickness and the characteristic of each of the backing layer, the magnetic layer, and the first protection film and to flatten each layer and film. In addition, use of the sputtering enables a reduction of a defective fraction as compared with plating because no contamination occurs due to dust or particles present in the atmosphere. Such a reduction of defective fractions serves to lower the manufacturing cost.

What is claimed is:

1. A magnetic recording medium comprising a substrate member having a principal surface, a magnetic layer on said principal surface, a protection layer formed on said magnetic layer to protect said magnetic layer, and a lubricant layer formed on said protection layer, said substrate member comprising a substrate composed of a glass or ceramic material;

said protection layer comprising a first protection film of a nonmagnetic material on said magnetic layer and a second protection film on said first protection film, said second protection film being formed by an inorganic oxide film and hard minute particles dispersed in said inorganic oxide film.

2. A magnetic recording medium as claimed in claim 1, wherein the substrate has a surface roughness which is not greater than 100 angstroms when said surface roughness is represented by a maximum height (Rmax).

3. A magnetic recording medium as claimed in claim 2, wherein the substrate has no projection which exceeds a height of 1000 angstroms.

4. A magnetic recording medium as claimed in claim 2, wherein the substrate has no projection which exceeds a height of 760 angstroms.

5. A magnetic recording medium as claimed in claim 1, wherein said inorganic oxide film of the second protection film is composed of at least one inorganic oxide selected from the group consisting of silicon oxide and metal oxides.

6. A magnetic recording medium as claimed in claim 5, wherein said inorganic oxide film is obtained by processing a selected one of an organosilic compound and a metallic oxide.

7. A magnetic recording medium as claimed in claim 1, wherein said first protection film is composed of at least one material selected from the group consisting of nonmagnetic metals, semiconductors, and their compounds.

8. A magnetic recording medium as claimed in claim 1, said magnetic recording medium providing a medium principal surface, wherein said medium principal surface has a surface roughness between 50 and 300 angstroms when said surface roughness is represented by a maximum height (Rmax).

9. A magnetic recording medium as claimed in claim 8, wherein said medium principal surface has no projection which exceeds a height of 1000 angstroms.

10. A magnetic recording medium as claimed in claim 8, wherein said medium principal surface has no projection which exceeds a height of 760 angstroms.

11. A magnetic recording medium as claimed in claim 1, said second protection film being divisible into first and second areas which have said hard minute particles and no hard minute particles, respectively, said hard minute particles being defined by an average particle size, wherein said first protection film has a thickness between 20 and 150 angstroms while said second area of the second protection film and said lubricant film have thicknesses between 20 and 300 angstroms and between 10 and 30 angstroms, respectively, said average particle size falling within a range between 50 and 300 angstroms.

12. A magnetic recording medium as claimed in claim 1, said second protection film being divisible into first and second areas which have said hard minute particles and no hard minute particles, respectively, said hard minute particles being defined by an average particle size, wherein said first protection film has a thickness between 20 and 150 angstroms while said second area of the second protection film and said lubricant film have thicknesses between 20 and 200 angstroms and between 10 and 30 angstroms, respectively, said average particle size falling within a range between 50 and 200 angstroms.

13. A magnetic recording medium as claimed in claim 1, wherein said substrate member comprises an intermediate layer between said substrate and said magnetic layer to provide said principal surface.

14. A magnetic recording medium as claimed in claim 13, wherein said intermediate layer is composed of a single film.

15. A magnetic recording medium as claimed in claim 13, wherein said intermediate layer is composed of a plurality of films.

* * * * *